Sept. 2, 1941.   A. MEYER   2,254,233
APPARATUS FOR FORMING VULCANIZED ARTICLES
Filed Oct. 22, 1937   3 Sheets-Sheet 1

INVENTOR
Arnold Meyer.
BY Harness, Dickey & Pierce.
ATTORNEYS.

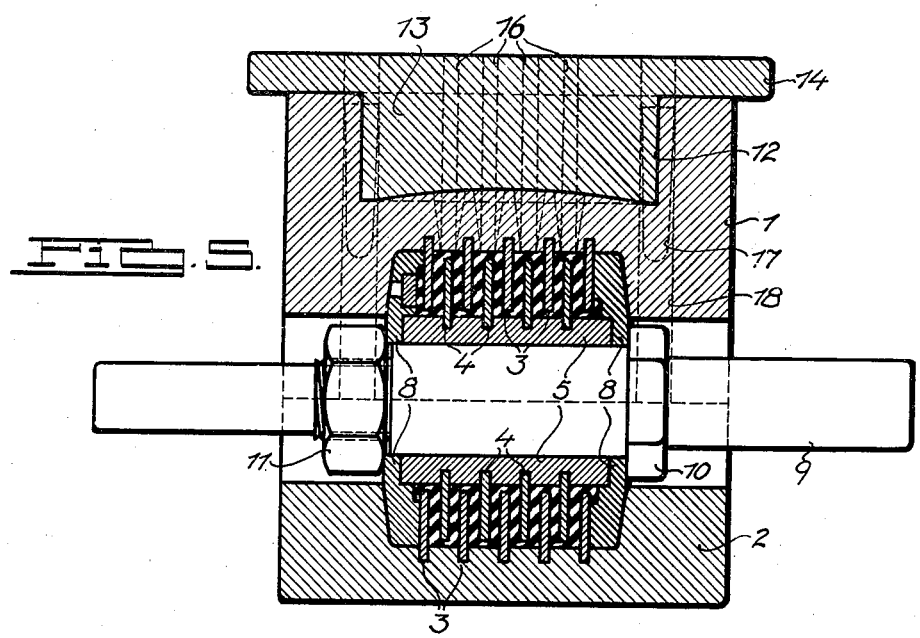
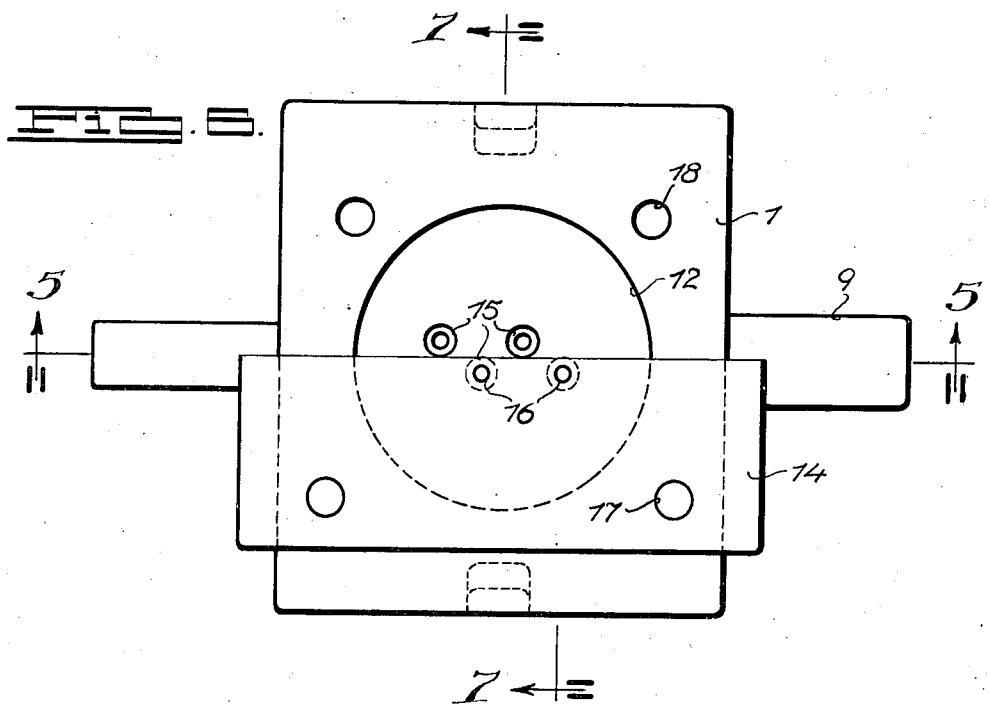

Sept. 2, 1941.                A. MEYER                2,254,233
            APPARATUS FOR FORMING VULCANIZED ARTICLES
                    Filed Oct. 22, 1937        3 Sheets-Sheet 3

INVENTOR.
Arnold Meyer.
BY
Harness, Dickey & Pierce.
ATTORNEYS.

Patented Sept. 2, 1941

2,254,233

UNITED STATES PATENT OFFICE 2,254,233

APPARATUS FOR FORMING VULCANIZED ARTICLES

Arnold Meyer, Harburg-Wilhelmsburg, Germany

Application October 22, 1937, Serial No. 170,310
In Germany October 23, 1936

4 Claims. (Cl. 18—30)

The invention relates to the manufacture of articles to be made of material of a tenaciously plastic character.

Its object is to avoid loss of material and to obtain a smooth and unhurt surface of the articles to be made.

Another object of the invention is to provide a two or more part form or mould adapted to confine the size of the edge arising on the articles manufacturing adjacent the gap the different parts of the mould may leave open between one another.

A further object of the invention is thoroughly kneading and tempering the material immediately before moulding.

Still another object of the invention is to prevent from arising on the surface of the articles moulded any lugs similar to the ingot lugs which result in connection with casting.

Another object of the invention is manufacturing in an easy and reliable manner articles of metal rubber construction, parts, that are now very much used in vibration engineering, in which the vulcanizing takes place under high pressure and at comparatively high temperature.

Another object of the invention is to provide an improved process and apparatus for filling vulcanizing forms and producing a vulcanized product, which obtains a product more economically and which also obtains a product of improved character.

Further objects will be seen from the drawings and from the annexed specification and from the claims drawn in connection therewith.

In the drawings are shown some embodiments of devices fit for performing the invention, the said devices too partaking in constituting the invention.

Fig. 5 is a longitudinal section on the line 5—5 of Fig. 6 of a mould for a purpose similar to that of the mould, shown in Fig. 4.

Fig. 6 is a plan view of the device shown in Fig. 5 with one half of the pressure exerting piston left.

Figure 1:
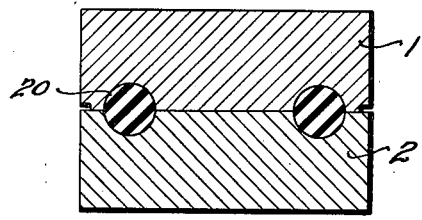
Fig. 1 shows in cross-section a two-part mould as has been used hitherto the two parts of the mould adjoining one another by flat surfaces.

Fig. 1 shows a mould or form as has been commonly used heretofore for performing pressing methods in connection with rubber metal constructions as well as for other purposes. In connection with moulds of this kind one common plane comprises all of the surfaces, by which the upper and lower parts 1 or 2 respectively join one another. It has been experienced that edges of troublesome character easily arise on the manufacture made in such moulds, when the said moulds are used in connection with pressing methods. This is one of the disadvantages, which is eliminated by the present invention.

Figure 2:
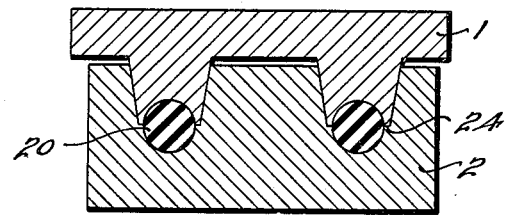
Fig. 2 shows in cross-section two-part mould adapted to be used when manufacturing one body.
Figure 3:
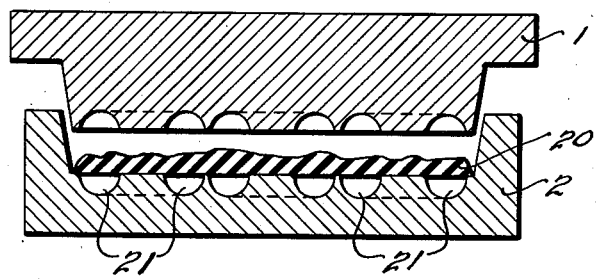
Fig. 3 shows in cross-section two-part mould adapted to be used when manufacturing a plurality of bodies simultaneously.
Figure 4:
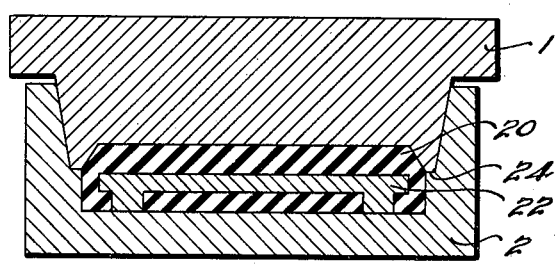
Fig. 4 shows in cross-section a mould for getting rubber manufactured in a reliable attachment on a metal member, which has been placed into the mould.

The upper parts 1 of the forms shown in Figs. 2, 3 and 4 are provided to constitute each a pressure exerting piston, which is guided in the lower part 2 of the form. In connection with moulds constructed in this manner any level surfaces, by which the upper and lower parts join can be fully avoided; in addition thereto however it has been experienced, that edges of a troublesome character can be avoided too, when shoulders 24 are arranged adjacent the cavity of the mould as shown in Fig. 2 the said shoulders on the other hand being of good advantage when constructing the edges limiting the parts of the cavity in the different parts of the form respectively.

The form or mould shown in Fig. 3 is adapted to mould in a common form and by one operation a plurality of articles from a coherent piece 20 of the substance to be manufactured into the respective articles, the said piece of substance comprising a quantity of material which is similar or adequate to the quantity necessary to constitute the whole of the articles than can be commonly moulded in the respective form. The quantity necessary can be indicated by weight for instance. While the material is being submitted to pressure, it is mechanically spread and distributed over all of the cavities 21, 21 provided in the form.

In Fig. 4 a mould is shown, comprising an upper part guided in the lower part 2 in a piston-like manner, while into the cavity a metal element 22 has been inserted. Performing the pressing method above described, the said metal element 22 will be neatly surrounded by the substance submitted to pressure by the action of the piston-like operated upper portion 1 of the mould. As pointed out shortly below this is of special importance when manufacturing rubber metal constructions by means of the newly invented method above described.

Figure 7:
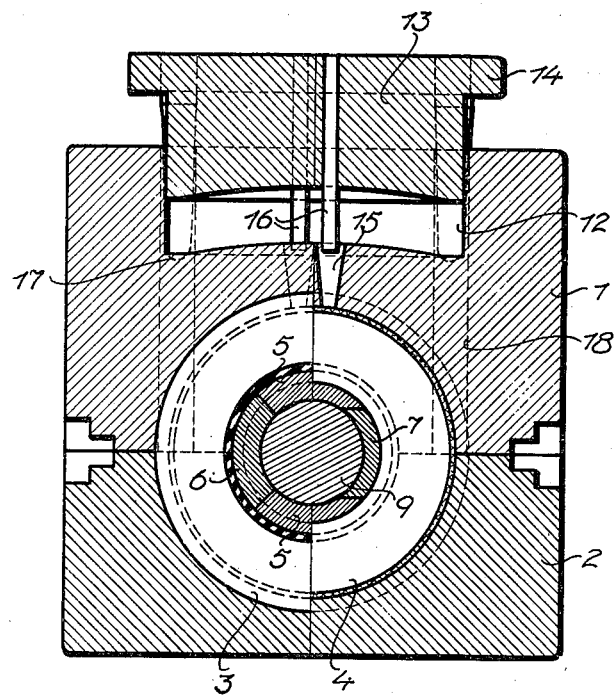
Fig. 7 is a broken section on the line 6—6 of Fig. 6.

Whereas in connection with the embodiments of the invention described above the upper part of the form or mould also constitutes the pressure exerting piston, and in a similar manner the cavity of the mould is operative as a pressure chamber simultaneously, in Figs. 5, 6 and 7 an embodiment of the present invention is shown, which comprises a pressure chamber and a pressure exerting piston 13, which are arranged in connection with the upper part of the form separately from the cavity of the same, the pressure chamber being connected to the cavity of the form through feed channels 15.

This embodiment of a mould or form according to the invention is particularly fit for the manufacture of rubber metal constructions parts. The form hitherto used for applying the unvulcanized, tough and unhandy masses of rubber is that of single pieces which, suitably placed together, fill the whole hollow spaces between the metallic parts that are to be vulcanized to them. The combined volumes of the individual pieces must together correspond exactly with the hollow spaces that are to be filled, which often is difficult. A further disadvantage consists in the layers produced by the individual parts, which decreases the homogeneousness.

An important feature of the invention is the fact that the mass of rubber is applied in the vulcanized form and placed mechanically between the metallic parts by pressing the mass of rubber into the form by means of a pump, the channels to be filled being so calculated, that a uniform distribution of the mass is insured. The advantages of the invention as compared with the known process consist in the much smaller time expenditure for the application and in an additional kneading of the mass of rubber during the application and in the complete homogeneousness, which improves all the valuable properties of the rubber and its adhesion to the metal.

The form according to Figs. 5, 6 and 7, which can be used as a vulcanizing form consists in the known manner of upper and lower parts 1 and 2, which are pressed exactly together and connected by means of screws, so that they can resist the high pressures that occur during the vulcanizing process. The halves of the form are machined in such a way that the corresponding metallic parts, in the present form of construction the rings 3, can be held rigidly. The other metallic parts, the rings 4, are held by a four-part sleeve 5, 6, 7 (Fig. 7), which together with two end discs 8 are pushed onto the mandrel 9 and held there by the nut 11. The assembled parts 4 to 10 fit exactly in the form 1, 2, leaving open the hollow spaces that are to be filled with rubber. The cylinder 12 is suitably bored out in the upper part 1 of the form and in it is movable the piston 13, which can be enclosed by a cover 14. From the arched head of the cylinder 12 a number of funnel-shaped feed channels 15 lead to the form. The number and the emptying place of the channels 15 are calculated in such a way for each individual case that the masses of rubber can be distributed uniformly and without any obstruction in all directions, since on account of the viscosity of the unvulcanized rubber this is important for the success of the work and the value of the finished object. Corresponding to the number and the position of the feed channels 15, cylindrical rams 16 are fastened in the piston 13, which are arranged coaxially with the channels 15. They are insured against lateral shifting by guide pins 17 which are fastened in the piston cover 14 and are movable in holes 18 in the upper part 1.

The device is prepared for use by first assembling the sleeve 5 to 7 from its individual parts and in the operation fitting the metallic rings 4 into the grooves provided for them and loosely arranging the rings 3 between the rings 4. The parts assembled in that manner, after one of the end discs 8 is placed on the sleeve 5 to 7, is pushed onto the middle part of the bolt 9 against the head 10. Then the second end disc 8 is placed in front of it and all clamped fast on the bolt 9 by means of the nut 11. The core 3 to 11, thus finished, is placed in the lower part 2 of the form, the previously loose discs 3 then disposed in the grooves in this part of the form and held tightly therein. After similarly mounting the upper part 1 and screwing it fast to the lower part 2, the form is ready for the introduction of the rubber. An exactly weighed quantity of the rubber is placed in the cylinder, with the piston raised and the piston is again placed in the cylinder. The form is then placed in a press, and the rubber is pressed through the feed channels 15 between the metallic rings 3 and 4. With an arrangement of the channels 15 corresponding to the metallic parts 4, there takes place a uniform distribution of rubber in all directions and a subsequent thorough kneading of the mass of rubber. The air previously contained in the form escapes during the pressing process between the separation surfaces of the parts 1 and 2 of the form. As soon as the piston 13 has reached its lowest position in the cylinder 12 and the entire quantity of rubber is in the form, the front ends of the rams 16 have reached the lower outlets of the feed channels and, since they fit the lower ends of the channels exactly, the masses of rubber are cut off from the part remaining in the channels 15. In this manner is prevented any later separation after vulcanizing, which certainly would impair the surface of the rubber.

The rubber is then vulcanized and the complete vulcanized rubber-metal part is then removed by first separating the upper part 1 from the lower part 2 and removing the bolt 9. Then after loosening the nut 11, the assembly is withdrawn from the bolt, then the two end discs 8 are taken off and part 7 of the sleeve is pushed inwardly and drawn out. Then the parts 5 and 6 also can be pushed inwardly and removed through the opening. There still remains in the form the assembly consisting of the metallic rings 3 and 4 and the mass of rubber vulcanized between them, which can be fitted in a manner corresponding to the purpose of the individual application.

What is claimed is:

1. An apparatus for forming articles from rubber, comprising a multiple part mold having cavities for defining the shape of the article and having its parts fitting closely together around the cavities so as to eliminate extrusion of rubber out of the cavities, a cylinder for receiving rubber in a plastic condition, a piston in the cylinder for forcing rubber from the latter, spaced channels leading from an end of the cylinder and which taper to smaller ends that open to the cavities so that the rubber may be forced into the mold cavities by movement of the piston and distributed throughout the cavities by the spacing of the channels, and plungers movable with the piston and along the channels and adapted to increasingly boost the pressure on the rubber in the channels as the piston moves and the plungers approach the smaller ends of the channels, said plungers being adapted to close the smaller ends of the channels when the plunger and pistons have moved a predetermined amount.

2. An apparatus for forming articles from rubber, comprising a multiple part mold having cavities for defining the shape of the article and having its parts fitting closely together around the cavities so as to eliminate extrusion of rubber out of the cavities, a cylinder for receiving rubber in a plastic condition, a piston in the cylinder for forcing rubber from the latter, spaced channels leading from an end of the cylinder and which open to the cavities so that the rubber may be forced into the cavities by movement of the piston and distributed throughout the cavities by the spacing of the channels, plungers movable with the pistons and along the channels and being so related to the latter that the piston forces the rubber along the channels past the outer surfaces of the plungers and the latter boost the pressure on the rubber ahead of the plungers, the channels having their ends next to the cavities sufficiently small that the plungers close such ends of the channels at the end of the injecting operation.

3. An apparatus for forming a rubber product which comprises a form having a cavity for receiving rubber in a plastic condition, a cylinder space in one side of the form, feed channels leading from the cylinder base to the cavity, pressure means in the cylinder space for forcing rubber from the space through the channels and into the cavity, and plungers on the pressure means adapted to move into the channels and to increase the mixing and kneading action on the rubber and also to boost the pressure on the rubber in the channels.

4. An apparatus for forming a rubber product which comprises a form having a cavity for receiving rubber in a plastic condition, a cylinder space in one side of the form, feed channels leading from the cylinder base to the cavity, a piston in the cylinder space for forcing rubber from the space through channels and into the cavity, and plungers movable with the piston adapted to move into the channels and to increase the mixing and kneading action on the rubber and also to boost the pressure on the rubber in the channels, said channels being funnel shape and of such dimensions as to permit feeding of the rubber past the plungers until the plungers reach the smaller ends of the channels at which time the channels are closed by the plungers, the funnel shape of the channels also acting to progressively decrease the space around the plungers as the latter move towards the smaller ends of the channels whereby the kneading action is further accentuated and the pressure is increased greatly towards the end of the operation.

ARNOLD MEYER.